L. ROTHFUCHS.
DIRIGIBLE HEADLIGHT FOR AUTOMOBILES.
APPLICATION FILED OCT. 29, 1917.
1,297,913.
Patented Mar. 18, 1919.
2 SHEETS—SHEET 1.
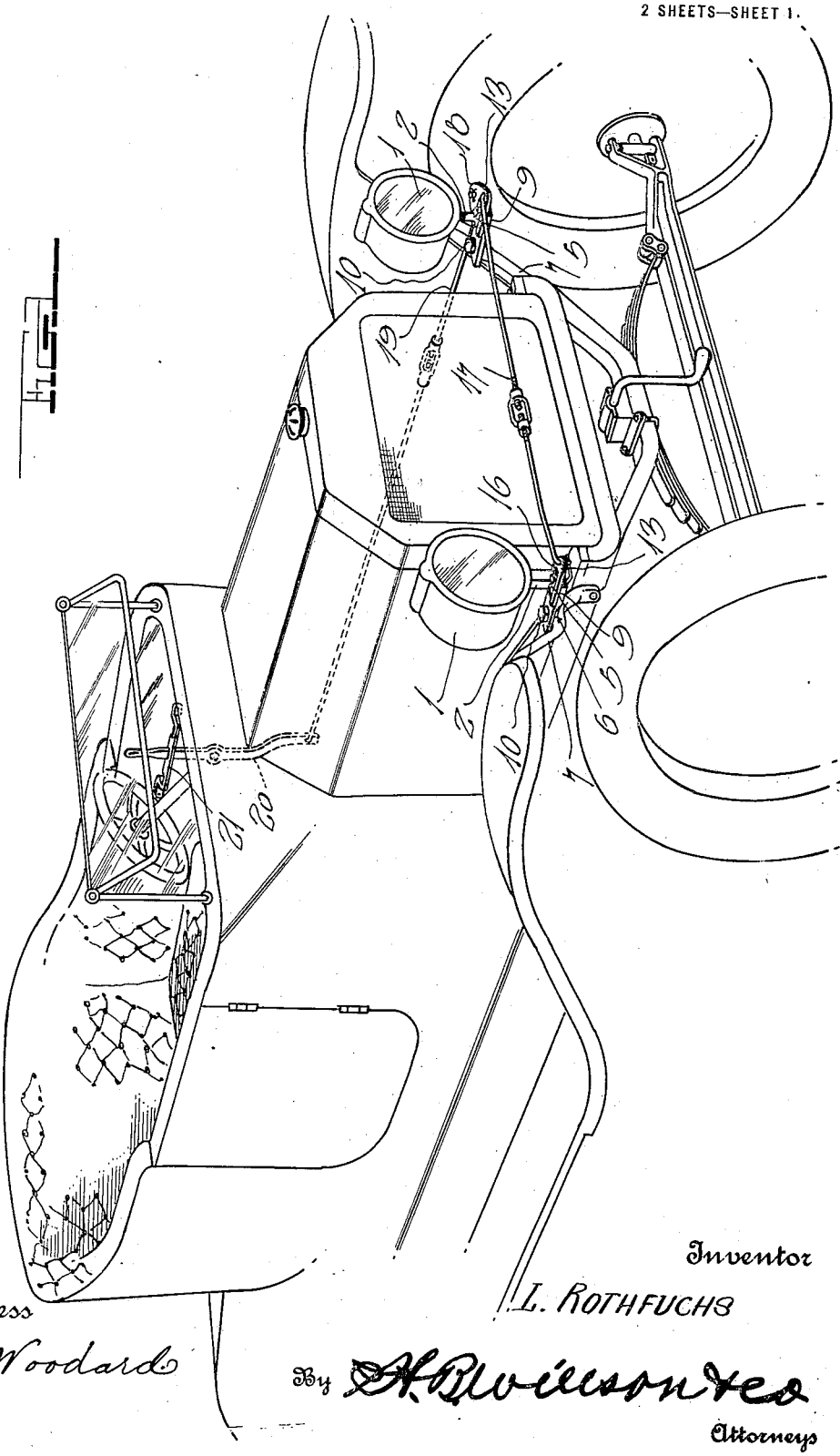
Witness
H. Woodard
Inventor
L. Rothfuchs
By H. B. Willson & Co
Attorneys

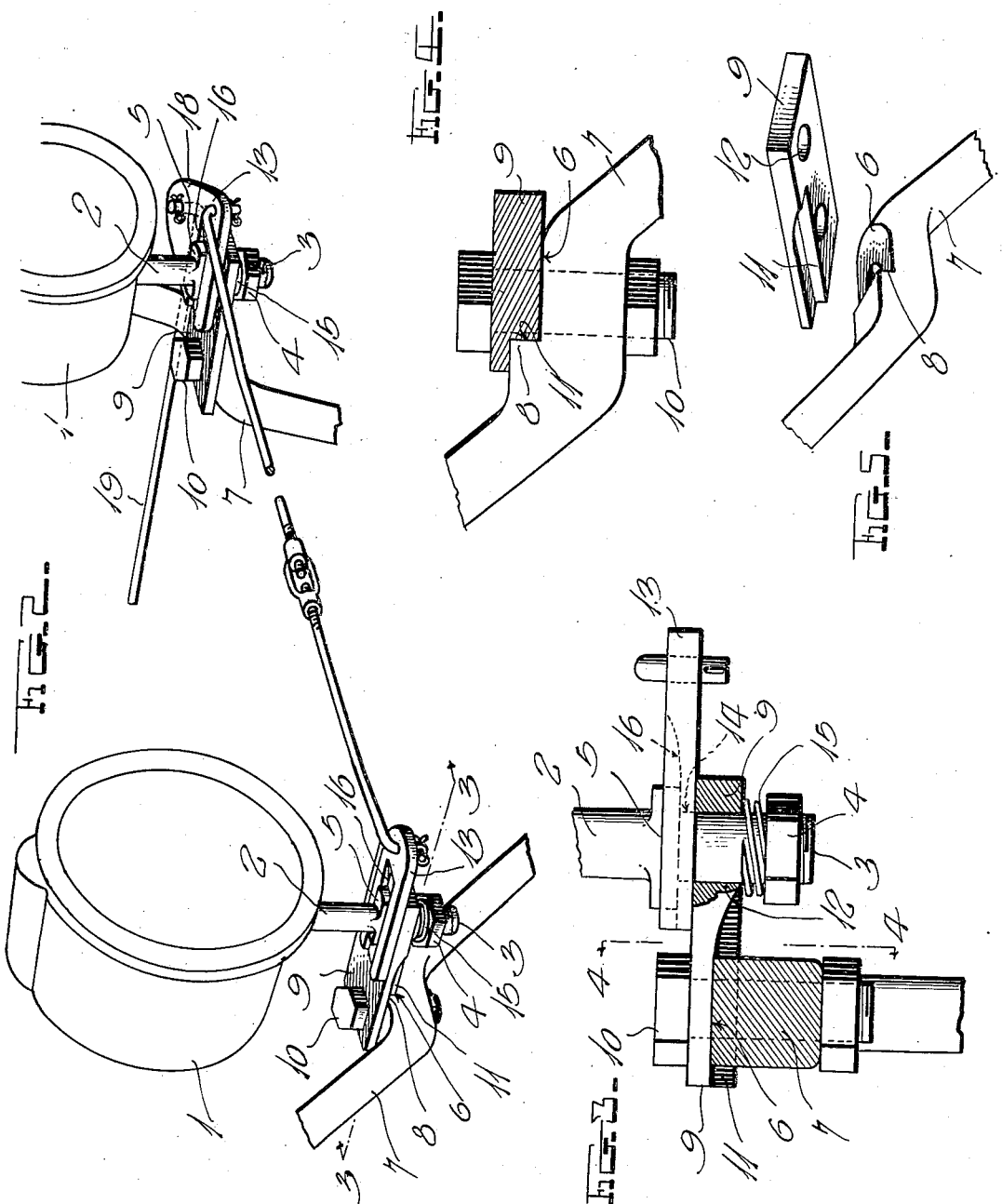

UNITED STATES PATENT OFFICE.

LOUIS ROTHFUCHS, OF THREE OAKS, MICHIGAN, ASSIGNOR OF ONE-HALF TO GUSTAVE ROTHFUCHS, OF THREE OAKS, MICHIGAN.

DIRIGIBLE HEADLIGHT FOR AUTOMOBILES.

1,297,913.  Specification of Letters Patent.  Patented Mar. 18, 1919.

Application filed October 29, 1917. Serial No. 199,103.

*To all whom it may concern:*

Be it known that I, LOUIS ROTHFUCHS, a citizen of the United States, residing at Three Oaks, in the county of Berrien and State of Michigan, have invented certain new and useful Improvements in Dirigible Headlights for Automobiles; and I do declare the following to be a full, clear, and exact description of the invention, such as will enable others skilled in the art to which it appertains to make and use the same.

My invention has for its object to provide an extremely simple, easily manufactured and inexpensive device for so mounting the headlights of Ford automobiles, as to permit such lights to be swung laterally to illuminate the roadway when making turns, or whenever it is necessary to direct the rays of light otherwise than straight ahead.

With the foregoing general object in view, the invention resides in the novel features of construction and the unique combinations of parts to be hereinafter fully described and claimed, the descriptive matter being supplemented by the accompanying drawings which form a part of this specification and in which:—

Figure 1 is a perspective view of an automobile showing the application of my invention;

Fig. 2 is an enlarged perspective view of the head lights, the headlight brackets, and the improved mounting of the former;

Fig. 3 is a vertical sectional view on the plane indicated by the line 3—3 of Fig. 2;

Fig. 4 is a transverse section on the plane of the line 4—4 of Fig. 3; and

Fig. 5 is a detail perspective of a portion of one of the lamp brackets and the supporting plate which is secured thereto.

In the drawings above briefly described, the numeral 1 designates a pair of headlights mounted on the usual posts 2 which are threaded at their lower ends as indicated at 3 and provided with nuts 4, each post having a horizontally elongated foot 5. The feet 5 are adapted to rest on flat horizontal seats 6 with which the fender and lamp brackets 7 are provided, the edges of said seat then contacting with the vertical shoulders 8 to prevent turning of the posts. Due to the nature of the present invention, however, the lamp posts are detached from the seats 6, moved forwardly, and mounted in such a manner as to permit them to turn from side to side.

A pair of flat horizontally elongated supporting plates 9 are provided, the rear ends of said plates being adapted to rest upon the seats 6 and to be secured thereto by bolts 10, the outer edge of each plate 9 being shouldered at 11 for engagement with the shoulder 8, whereby horizontal swinging of the plates is prevented. The front ends of the plates 9 are formed with openings 12 of a size to receive the threaded lower ends of the posts 2 loosely, and a pair of horizontally swinging plates 13 rest upon said plates 9 and are formed with openings 14 which aline with said openings 12, said alined openings being adapted to loosely receive the lower ends of the lamp posts 2 as shown, coiled springs 15 being interposed between the nuts 4 and said plates 9.

By the arrangement of parts just described, the plates 13 are pivoted to the plates 9 for horizontal turning, and the springs 15 hold these plates in tight contact to prevent any possibility of rattling. In order that the lamp posts 2 may turn with the plates 13, the upper sides of these plates are formed with longitudinal channels 16 receiving the seat 5, the sides of said channels forming shoulders abutting said seats.

The two plates 13 are connected by a rod 17, whereby they are caused to turn together, and one of said plates is provided with a lateral extension 18 from which a rod 19 leads rearwardly to a hand lever 20 or any other suitable control within the car. A suitable rack 21 is shown for holding the lever 20 in adjusted position but it will be obvious that other suitable arrangements could well be employed should occasion so demand. Also, although the lever 20 is shown as being sprung into engagement with the rack 21, another form of rack and an ordinary dog could well be utilized.

From the foregoing, taken in connection with the accompanying drawings, it will be obvious that I have provided an extremely simple and inexpensive attachment for so mounting the headlights of Ford automobiles as to permit them to swing laterally whenever required. Particular emphasis is laid upon the fact that the usual posts 2 are utilized for pivoting the plates 9 and 13 together, as well as for carrying the headlights 1. By this arrangement, the number of parts necessary is reduced to the minimum, yet the efficiency of the device is not impaired by its extreme simplicity.

Since probably the best results are obtained from the several specific details shown and described, these details are preferably employed, but I wish it understood that within the scope of the invention as claimed, numerous minor changes may well be made.

I claim:—

1. An attachment for automobiles comprising a horizontal supporting plate and a bolt for attaching it fixedly to one of the lamp post seats of the automobile, the front end of said plate having a vertical opening, a horizontally swinging plate resting on said supporting plate and having an opening alined with said first named opening, said alined openings being adapted to loosely receive the threaded lower end of a lamp post, a spring to be interposed between said supporting plate and the nut of said threaded post end, whereby said swinging plate is pivoted to said supporting plate and held yieldably against the same to prevent rattling, said swinging plate having a shoulder for engagement with the foot at the lower end of the lamp post to cause said post to turn with said swinging plate, and means for swinging said plate.

2. An attachment for automobiles comprising a horizontal supporting plate and a bolt for attaching it fixedly to one of the lamp post seats of the automobile, the front end of said plate having a vertical opening, a horizontally swinging plate resting on said supporting plate and having an opening alined with said first named opening, said alined openings being adapted to loosely receive the threaded lower end of a lamp post, a spring to be interposed between said supporting plate and the nut of said threaded post end, whereby said swinging plate is pivoted to said supporting plate and held yieldably against the same to prevent rattling, said swinging plate having a channel in its upper face to receive the elongated foot of the lamp post to cause said post to turn with said swinging plate, and means for swinging said plate.

3. The combination with an automobile headlight bracket having a horizontal upper side and a vertical shoulder rising from said side, said bracket also having a vertical opening adjacent its shoulder, a horizontal supporting plate resting on and extending forwardly from said bracket, said plate engaging said shoulder, a bolt passing through said plate and through the aforesaid opening for securing the former rigidly to the lamp bracket, the front end of said plate having an opening, a horizontally swinging plate resting on said supporting plate and having an opening alined with that of the latter, the upper side of said swinging plate having a vertical shoulder, a lamp post having a foot resting on said swinging plate and engaging said shoulder thereof, said post also having a threaded lower end passing loosely through said alined openings, a nut on said lower end of the lamp post, a spring interposed between said supporting plate and said nut, and means for turning said swinging plate.

In testimony whereof I have hereunto set my hand in the presence of two subscribing witnesses.

LOUIS ROTHFUCHS.

Witnesses:
 CHARLES HOLMES,
 LOUIS J. KLING.